United States Patent [19]

Matsuo et al.

[11] Patent Number: 5,541,758
[45] Date of Patent: Jul. 30, 1996

[54] PHOTOTRANSMISSION METHOD

[75] Inventors: Nozomu Matsuo, Yokohama; Hideyuki Omura, Chigasaki; Takesi Kawaguchi, Hiratsuka; Yukihisa Sinoda, Kashiwa, all of Japan

[73] Assignees: The Furukawa Electric Co., Ltd.; The Tokyo Electric Power Company, Incorporated, both of Tokyo, Japan

[21] Appl. No.: 390,355

[22] Filed: Feb. 17, 1995

[30] Foreign Application Priority Data

Feb. 17, 1994 [JP] Japan ..................... 6-043113

[51] Int. Cl.$^6$ ................................... H04J 14/02
[52] U.S. Cl. .................... 319/133; 319/180; 319/173; 372/38
[58] Field of Search ................................ 359/125, 133, 359/164, 173, 180, 181; 372/38, 29

[56] References Cited

U.S. PATENT DOCUMENTS 5,107,360  4/1992  Huber .................... 359/181

Primary Examiner—Leo Boudreau
Assistant Examiner—Kinfe-Michael Negash
Attorney, Agent, or Firm—Jacobson, Price, Holman & Stern, PLLC

[57] ABSTRACT

There is provided a phototransmission method that can effectively avoid any deterioration by beats in the optical signal quality of a phototransmission system and transmit signals to a single receiving station with a substantially equal light intensity level even if only a narrow gap is provided for any two close wavelengths that are used for signal transmission and if the wavelength of the laser beam emitted from each semiconductor laser diode of the system is allowed to fluctuate only within a narrow limit so that the system may accommodate a large number of different light waves (transmitting stations). The light intensity level of optical signals produced at the optical output terminal of each semiconductor laser diode 3 is regulated by setting the bias current of the semiconductor laser diode 3 to a value between one and a half times and five times the threshold current of the semiconductor laser diode. Alternatively, the light intensity level of optical signals produced at the optical output terminal of each semiconductor laser diode 3 is regulated by setting the bias current of the semiconductor laser 3 to a value between twice and four times the threshold current of the semiconductor laser diode. Preferably, the light intensity levels of optical signals produced by different semiconductor laser diodes 3 of he optical transmission system are regulated by respective optical attenuators 4 operating for different degrees of attenuation.

3 Claims, 5 Drawing Sheets

PHOTOTRANSMISSION METHOD

BACKGROUND OF THE INVENTION

This invention relates to a phototransmission method that can be suitably used with optical CATV systems, optical ITV systems, optical transmission monitoring systems and other optical systems.

PRIOR ART

There are known a number of different optical signal transmission methods that can be used for the above identified applications. Such methods are typically used with a system schematically illustrated in FIG. 3A and comprising a plurality of (a total of n) transmitting stations $1_1, 1_2, \ldots, 1_n$ spaced apart from each other by several hundred meters to several kilometers and a single receiving station 2 where the statuses of all transmitting stations 1 are visually and collectively monitored. Each of the transmitting stations $1_1, 1_2, \ldots, 1_n$ is provided with a video camera 11 to pick up a movie thereof, a modulator 12, a semiconductor laser diode 3 and an optical coupler 14. Optical signals are transmitted from the transmitting stations 1 to the receiving station 2 by way of an optical fiber transmission path 15. The receiving station 2 is provided with an optical receiver 16, a demodulator 17 and a monitor television set 18.

Video signals of the transmitting stations $1_1, 1_2, \ldots, 1_n$ are then carried on respective subcarriers having station-specific frequencies by the modulators 12 of the transmitting stations $1_1, 1_2, \ldots, 1_n$, and optical signals generated by the semiconductor laser diodes 3 are intensity-modulated by respective video signals. While the frequency band used for subcarriers may vary depending on the phototransmission system, it is found between 0.4 and 2 GHz for the system of FIG. 3A. Optical signals from the transmitting stations $1_1, 1_2, \ldots, 1_n$ are then fed to the optical transmission path 15 by way of the respective passive optical couplers 14, where the signals are multiplexed to exhibit a waveform as shown in FIG. 3F (that may be measured at point F in FIG. 3A), and further to the optical receiver 16 of the receiving station 2. Electric signals from the optical receivers 16 are sorted out for the respective subcarrier frequencies by the demodulator 17 and movies from the stations are reproduced on the monitor television set 18 for monitoring. Note that, in FIG. 3A, the solid arrows indicate flows of electric signals transmitted by coaxial cables whereas the broken arrow shows the flow of optical signals transmitted by a ramified optical fiber cable.

In a phototransmission system as shown in FIG. 3A where two or more optical signals are multiplexed for transmission and received collectively by a single receiving station 2, the light intensity levels of the optical signals coming from the transmitting stations $1_1, 1_2, \ldots, 1_n$ need to be made substantially equal to each other somehow when the signals are received by the optical receiver 16 of the receiving station 2 because optical signals from a relatively remote transmitting station may be subject to a greater loss as they pass through the optical transmission path 15 and the passive optical coupler 14, and the light intensity of the signals may have been significantly attenuated when they get to the receiving station 2. By equalizing the optical signal levels, the influence of noise on each of the optical signals should be made equal.

FIGS. 3B through 3E show conventionally how the light intensity levels of optical signals coming from different transmitting stations are equalized. The bias currents of the semiconductor laser diodes 3 of the transmitting stations $1_1, 1_2, \ldots, 1_n$, in are differentiated in terms of the signal level as a function of the distance separating the transmitting and receiving stations, the bias current of the semiconductor laser diode 3 of the most remote transmitting station $1_1$ being set to a highest level, so that the light intensity levels of optical signals coming from the transmitting stations may be substantially equal to each other when the signals get to the optical receiver 16 of the receiving station 2. FIGS. 3B through 3E show the relationships between the bias current and the optical output level of the different transmitting stations observed at points B, C, D and N in FIG. 3A respectively.

When two or more optical signals are multiplexed such that they are sorted out by the optical receiver 16, as in the case of FIG. 3A, the optical beat interference is generated as a function of the difference in the wavelength of optical signals. If optical beat interference appears with a frequency that agrees with the frequency band of the subcarrier, it can significantly deteriorate the quality of the optical signals. In order to avoid such deterioration, the optical wavelength of the laser beam emitted from each of the semiconductor laser diodes 3 has to be so selected that a certain level of optical signal quality is always maintained.

If a wavelength band of 1.55 μm is selected for the optical carrier wave, the central frequency of the beat will be about 125 GHz for a difference of 1 nm in the optical wavelength. If, for example, laser beams exhibiting a difference of 0.01 nm in the optical wavelength are combined, optical beat interference occurs with a frequency of about 1.25 GHz which, of course, coincides with the frequency band of the related subcarriers. Thus, the wavelengths of the laser beams to be multiplexed have to be so selected that they show a sufficiently large difference capable of effectively avoiding the occurrence of the beat interference having a frequency which coincides with a frequency band of the related subcarriers.

While the beat interference noise can be avoided by selecting optical signals wavelengths that sufficiently differ from each other, problems can occur in practical applications if the difference in the wavelength is too large. If, for example, a gap of 2 nm is provided for any two wavelengths that are close to each other in a phototransmission system designed to multiplex optical signals on up to 50 different lightwaves, the semiconductor laser diodes of the system are required to accommodate a total wavelength width of 100 nm. However, the cost of manufacturing semiconductor laser diodes that accommodate such a large wavelength width would be prohibitive. Thus, the difference in the wavelength cannot be made too large and has to be minimized without risking deterioration of the optical signal quality by the beat interference.

As a result of intensive research efforts in the study of beat noise, the inventors of the present invention have found that the line width of the laser beam generated by a semiconductor laser diode has to be rigorously controlled if wavelengths that are only slightly different from each other are used. Since the wavelength of a laser beam emitted from a semiconductor laser device can fluctuate within a certain limit on either side of the central wavelength, a relatively high value has to be selected for the gap separating any two wavelengths that are close to each other, taking such fluctuations into consideration. In other words, a large gap has to be provided for laser beams showing a wide band width.

FIGS. 4A through 4D illustrate the relationship between the bias current and the optical output level and between the optical output level and the spectrum of the optical output of a semiconductor laser diode obtained as a result of an experiment using a distributed feedback laser diode having a wavelength band of 1.55 μm and a threshold current Ith of about 15 mA. When the bias current is low, as indicated by A in FIG. 4A, the spectrum of the optical output of the laser diode shows shoulderlike side projections as illustrated in FIG. 4D that are attributable to fluctuations in the electron concentration within the laser diode and other causes so that consequently the spectrum exhibits a profile that spreads out over a wide range of wavelength. As the bias current of the semiconductor laser device is raised to the levels of B, C and D in FIG. 4A, the shoulderlike projections gradually disappear to show a narrowed spectrum profile. Note that FIGS. 4C and 4B respectively correspond to points B and C in FIG. 4A.

The above described phenomenon is commonly observable on different semiconductor lasers. If the semiconductor laser diodes of the conventional phototransmission system of FIG. 3 are operated with a low bias current as indicated by A in FIG. 4A, the noise level of the system will be higher than that of the system when the devices are operated with a higher bias current typically indicated by B or C in FIG. 4A. In the above experiment where the gap separating two close wavelengths was set to 0.2 nm, the noise level was higher by 10 to 15 dB when the bias current level was held as low as point A of FIG. 4A than when it was raised to point B or C of FIG. 4A. Thus, a greater gap was required to properly operate the system when the low bias current of point A was used.

As described above, with a conventional optical signal transmission method designed in such a way that a single receiving station 2 receives optical signals from a number of different transmitting stations with a substantially equal signal level by controlling the bias currents of the semiconductor lasers of the transmitting stations, any attempt to reduce the gap separating two close wavelengths inevitably faces a limit because of the phenomenon of changing spectrum profile observable on every laser beam generated by a semiconductor laser diode. This problem becomes grave as the number of transmitting stations 1 and hence that of wavelength bands increase. The fact that changes in the bias current are accompanied by changes in the profile of the wavelength band as shown in FIGS. 4B through 4D additionally increases the difficulty faced by an attempt to reduce the gap between two close wavelengths.

It is therefore an object of the present invention to provide a phototransmission method that can effectively avoid any deterioration by the beat interference in the optical signal quality in an optical signal transmission system, and transmit signals to a single receiving station with a substantially equal light intensity level if only a narrow gap is provided for any two close wavelengths that are used for signal transmission and the wavelength of the laser beam emitted from each semiconductor laser of the system is allowed to fluctuate only within a narrow limit so that the system may accommodate a large number of different lightwaves (transmitting stations).

SUMMARY OF THE INVENTION

According to an aspect of the invention, the above object is achieved by providing a phototransmission method of operating a photo-transmission system such that two or more semiconductor lasers generate optical signals modulated by signals to be transmitted and a single receiving station collectively receives the two or more optical signals and demodulates them characterized in that the light intensity level of optical signals produced at the optical output terminal of each semiconductor laser diode is regulated by setting the bias current of the semiconductor laser diode to a value between one and a half times and five times the threshold current of the semiconductor laser diode.

According to another aspect of the invention, there is provided a phototransmission method characterized in that the light intensity level of optical signals produced at the optical output terminal of each semiconductor laser diode is regulated by setting the bias current of the semiconductor laser diode to a value between twice and four times the threshold current of the semiconductor laser diode.

At the same time, the light intensity levels of optical signals produced by different semiconductor lasers of the optical transmission system are regulated by respective optical attenuators operating for different degrees of attenuation, and the output level at the optical output terminal is regulated by regulating means.

With a phototransmission method according to the first aspect of the invention wherein the light intensity level of optical signals produced at the optical output terminal of each semiconductor laser diode is regulated by setting the bias current of the semiconductor laser to a value between one and a half times and five times the threshold current of the semiconductor laser, the laser beam emitted from each laser advantageously produces a spectrum of light confined within a band width of less than 50 MHz. Since the bias current of each semiconductor laser is set to a value not exceeding five times the threshold current of the device, the linearity of the current-optical output relationship is maintained without increasing the distorted signal component and curtailing the service life of the semiconductor laser diode.

Additionally, because of the fact that the laser beam emitted from each laser advantageously produces a spectrum of light confined within a width of less than 50 MHz, the gap separating any two close wavelengths of optical signals produced from respective semiconductor lasers can be made very small (e.g., about 0.2 nm).

Still additionally, since the light intensity level of each optical signal produced from a semiconductor laser diode is regulated at the output terminal of the semiconductor laser, the semiconductor lasers of all transmitting stations of the phototransmission system can be operated with bias currents at substantially the same level. Consequently, optical signals generated by the semiconductor lasers show a stable spectrum of light that scarcely fluctuates so that the gap separating any two close wavelengths of optical signals produced from respective semiconductor lasers can be further reduced without adversely affecting tile C/N ratio.

With a phototransmission method according to the second aspect of the invention wherein the light intensity level of optical signals produced at the optical output terminal of each semiconductor laser diode is regulated by setting the bias current of the semiconductor laser diode to a value between twice and four times the threshold current of the semiconductor laser diode, the spectrum of light and the linearity of the current-optical output relationship of each semiconductor laser diode are further improved if compared with those achieved by a method according to the first aspect of the invention.

When a phototransmission system is so designed that the light intensity levels of optical signals produced by different semiconductor lasers of the optical transmission system are regulated by respective optical attenuators operating for different degrees of attenuation, the light intensity level of each optical signal can be conveniently controlled simply by regulating the related optical attenuator. This feature provides a major advantage when a method according to the invention is applied to a phototransmission system comprising a large number of transmitting stations because the operation of designing and regulating the gap separating two close wavelengths and the light intensity level of the optical signal from each semiconductor laser diode are remarkably simplified while maintaining a high optical signal quality.

Now, the present invention will be described in greater detail by referring to the accompanying drawings that illustrate preferable modes of carrying out the invention.

DETAILED DESCRIPTION OF THE INVENTION

1st Preferable Mode of Carrying Out the Invention

Figure 1A:
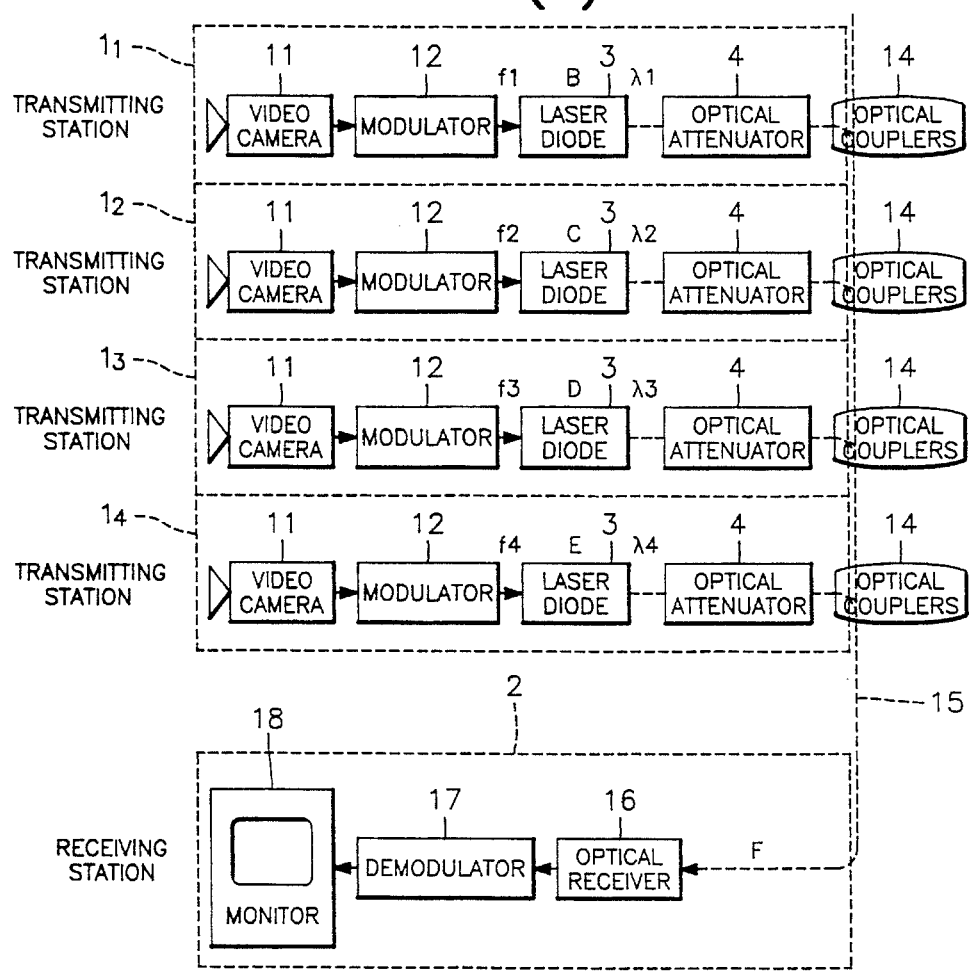
FIG. 1(a) is a schematic block diagram of a phototransmission realized by using a preferable mode of carrying out the present invention.
Figure 1B:
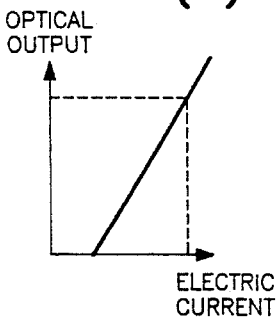
FIG. 1(b) is a graph illustrating the relationship between the bias current and the optical output at point B in FIG. 1(a).
Figure 1C:
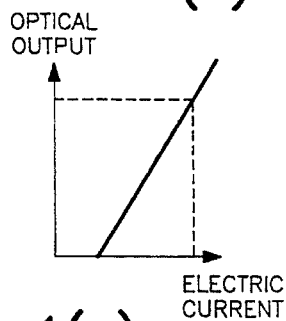
FIG. 1(c) is a graph illustrating the relationship between the bias current and the optical output at point C in FIG. 1(a).
Figure 1D:
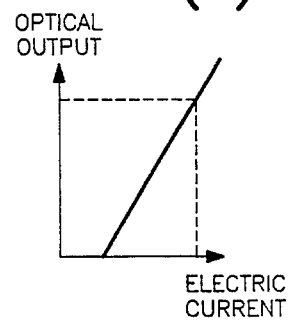
FIG. 1(d) is a graph illustrating the relationship between the bias current and the optical output at point D in FIG. 1(a).
Figure 1E:
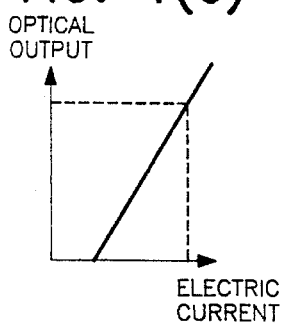
FIG. 1(e) is a graph illustrating the relationship between the bias current and the optical output at point E in FIG. 1(a).
Figure 1F:
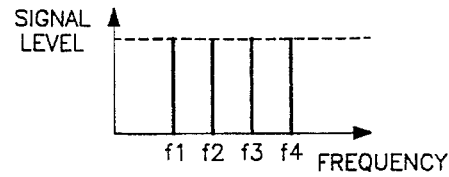
FIG. 1(f) is a graph schematically showing a multiplexed optical signal found at point F in FIG. 1(a).

FIG. 1(a) is a schematic block diagram of a phototransmission system realized by using a first preferable mode of carrying out the present invention and comprising a plurality of (n) transmitting stations $1_1, 1_2, \ldots, 1_n$ that are separated from each other by several hundred meters to several kilometers and a single receiving station 2 where movies from the transmitting stations can be collectively monitored. Each of the transmitting stations $1_1, 1_2, \ldots, 1_n$ is provided with a camera 11 to pick up an image thereof, a modulator 12, a semiconductor laser diode 3 and an optical coupler 14 and optical signals are transmitted from the transmitting stations $1_1, 1_2, \ldots, 1_n$ to the receiving station 2 by way of an optical fiber transmission path 15. The receiving station 2 is provided with an optical receiver 16, a demodulator 17 and a monitor television set 18.

Video signals of the transmitting stations $1_1, 1_2, \ldots, 1_n$ are then applied to respective subcarriers having station-specific frequencies by the modulators 12 of the transmitting stations $1_1, 1_2, \ldots 1_n$, and optical signals generated by the semiconductor laser diodes 3 are intensity-modulated by respective video signals. While the frequency band used for subcarriers may vary depending on the phototransmission system, it is found between 0.4 and 2 GHz for the system of FIG. 1(a). Optical signals from the transmitting stations $1_1, 1_2, \ldots, 1_n$ are then fed to the optical fiber trunk 15 (optical transmission path) by way of the respective passive optical couplers 14 and further to the optical receiver 16 of the receiving station 2. Electric signals from the optical receivers 16 are sorted out for the respective subcarrier frequencies by the demodulator 17 and movies from the stations are reproduced on the monitor television set 18 for monitoring.

TABLE 1

|  | laser current | laser optical output | optical transmission loss | optical attenuator | received light intensity |
|---|---|---|---|---|---|
| station $1_1$ | 48 mA | 3.0 dBm | −20 dB | 0 dB | −17.0 dBm |
| station $1_2$ | 47 mA | 2.9 dBm | −16 dB | 4 dB | −17.1 dBm |
| station $1_3$ | 48 mA | 3.1 dBm | −14 dB | 6 dB | −16.9 dBm |
| station $1_4$ | 46 mA | 2.8 dBm | 8 dB | −12 dB | −17.2 dBm |

Referring to FIG. 1, since the optical loss for the laser beam transmitted from each transmitting station 1 to the receiving station 2 via the optical transmission path 15 varies as the function of location of the transmitting station 1 (or the distance between the transmitting and receiving stations) as shown in Table 1 above, an optical attenuator 4 is provided at the optical output terminal of the semiconductor laser diode 3 of each transmitting station 1 to compensate for the optical loss (e.g., values listed in Table 1) so that optical signals transmitted from different transmitting stations 1 and received collectively by the receiving station 2 exhibit substantially the same light intensity level if the semiconductor lasers 3 of the transmitting stations 1 generates optical signals with a similar level regardless of the distance between the transmitting and receiving stations. Note that, while the optical attenuators 4 in FIG. 1 are general purpose optical attenuators, they may be replaced by any devices such as optical couplers that can operate as optical attenuators.

The semiconductor laser diodes 3 of FIG. 1 are DFB (distributed feedback) type lasers that typically operate at 1.55 m band and have a threshold current Ith of about 15 mA. As seen from Table 1, the bias current of the semiconductor laser diode is about 47 mA for all four transmitting stations 1 listed there.

Figure 4A:
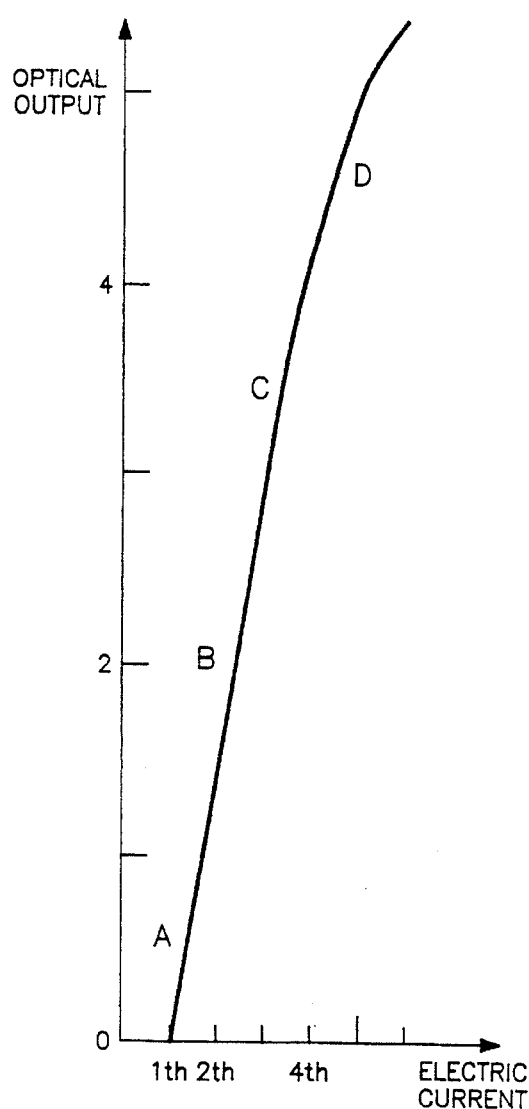
FIG. 4(a) is a graph illustrating the relationship between the bias current and the light intensity level of the optical signal of a semiconductor laser.
Figure 4B:
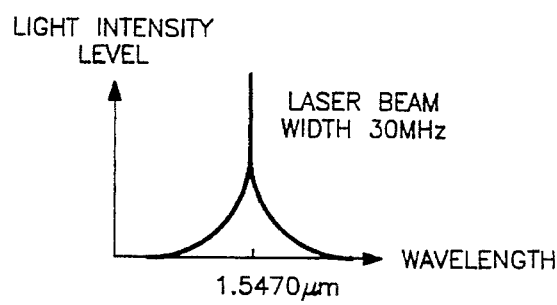
FIG. 4(b) is a graph showing the profile of the spectrum of the optical signal at point C in FIG. 4(a).
Figure 4C:
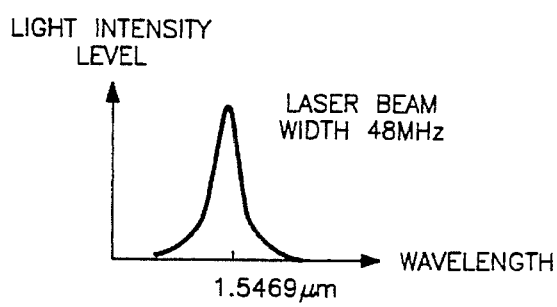
FIG. 4(c) is a graph showing the profile of the spectrum of the optical signal at point B in FIG. 4(a).
Figure 4D:
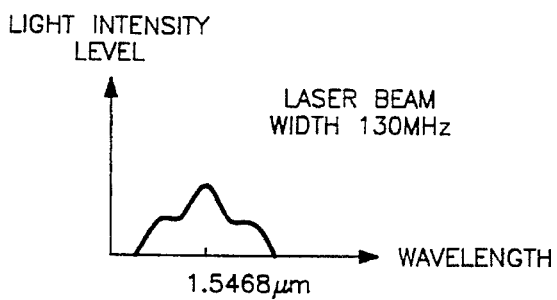
FIG. 4(d) is a graph showing the profile of the spectrum of the optical signal at point A in FIG. 4(a).

It has been found that a remarkably narrow spectrum profile confined within a width of less than 50 MHz can be obtained for the optical output of each semiconductor laser diode 3 by using a bias current that is twice or more than twice of the threshold current Ith of each semiconductor laser diode 3 in an optical signal transmission system as shown in FIG. 1 when an optical signal transmission method according to the invention is applied thereto. If the bias current is made greater than four times the threshold current Ith, the linearity of the relationship between the current and the optical output will be degraded to a certain extent as shown in FIG. 4A to increase the distorted component of the signal and curtail the service life of the semiconductor laser diode. In the above described mode of carrying out the invention, the bias current is about three times as large as the threshold current Ith. The linearity of the relationship between the current and the optical output and the service life of the semiconductor laser diodes in a phototransmission system using a signal transmission method according to the invention exceed their counterparts in an optical signal transmission system using a conventional signal transmission method, if the bias current of each semiconductor laser diode 3 is defined to be between one and a half times and five times the threshold current of the semiconductor laser diode, although the semiconductor laser diode performs better if the bias current of each semiconductor laser diode 3 is defined to be between twice and four times the threshold current of the semiconductor laser diode.

In the above described mode of carrying out the invention, the gap separating any two close wavelengths of the four wavelengths to be multiplexed is about 0.2 nm. Then, an excellent C/N (carrier/noise) ratio of greater than 20 dB will be obtained at the receiving station 2 wherein, in case of FM transmission, no optical beat interferences nor other noises will be observable.

2nd Preferable Mode of Carrying Out the Invention

Figure 2:
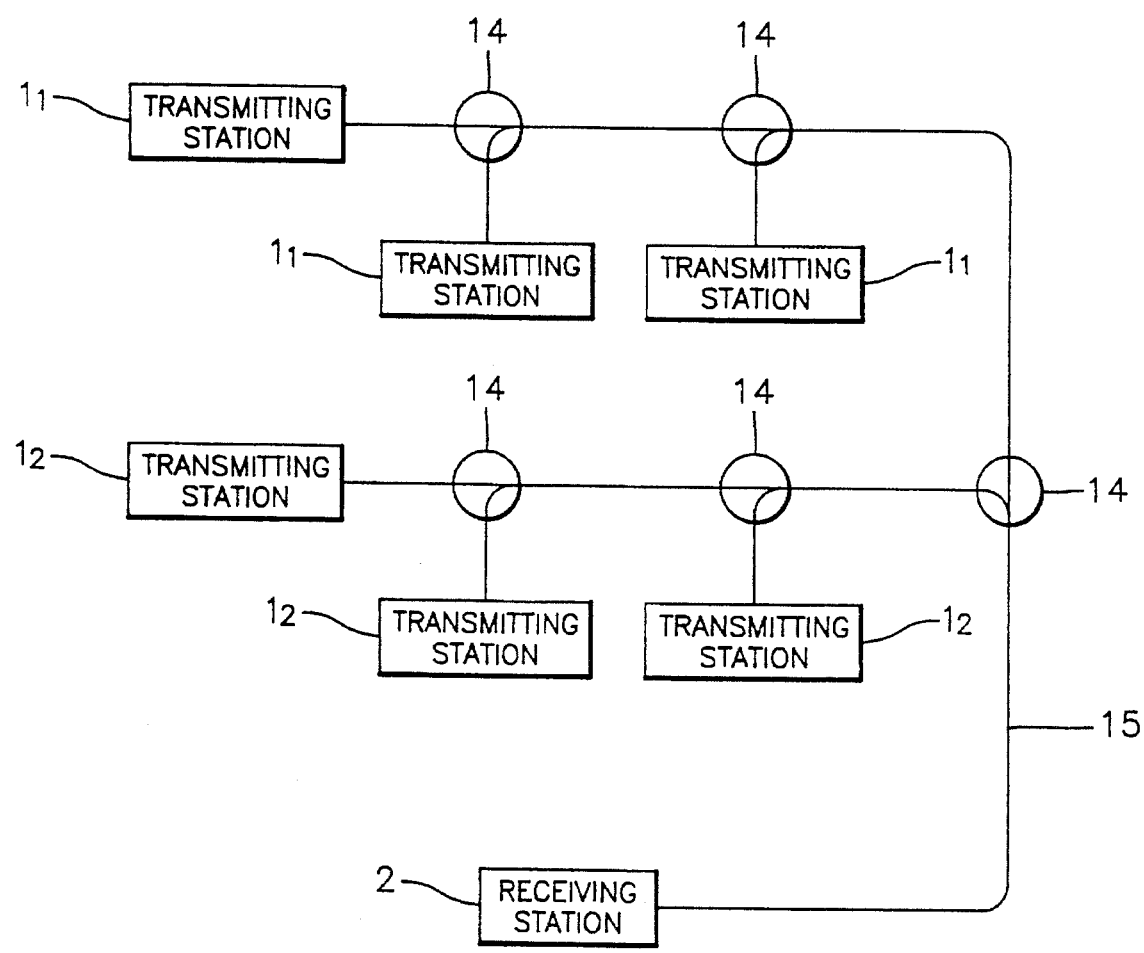
FIG. 2 is a schematic block diagram of an optical signal transmission system realized by using another preferable mode of carrying out the present invention.
Figure 3A:
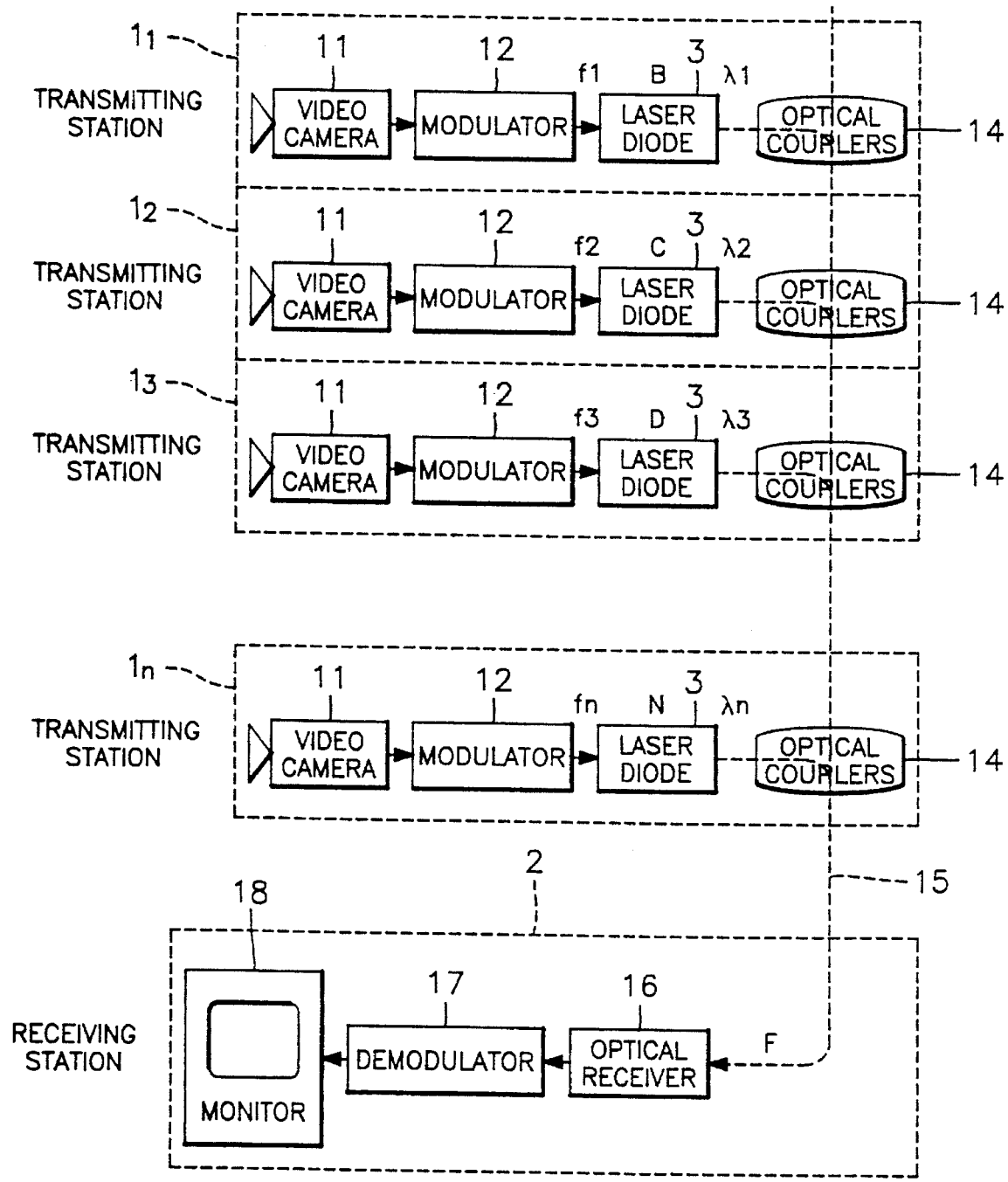
FIG. 3(a) is a schematic block diagram of an optical signal transmission system realized by using a conventional optical signal transmission method.
Figure 3B:
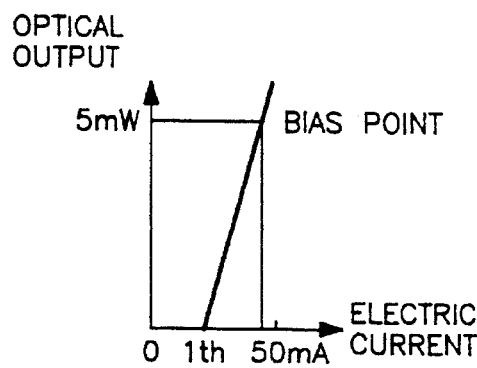
FIG. 3(b) is a graph illustrating the relationship between the bias current and the optical output at point B in FIG. 3(b).
Figure 3C:
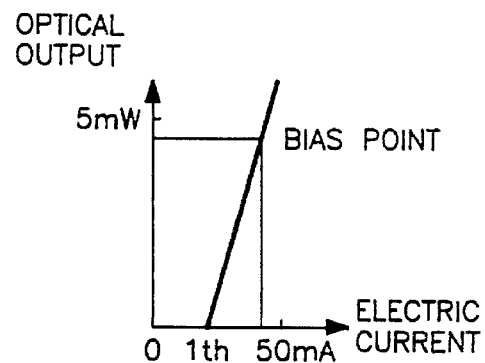
FIG. 3(c) is a graph illustrating the relationship between the bias current and the optical output at point C in FIG. 3(b).
Figure 3D:
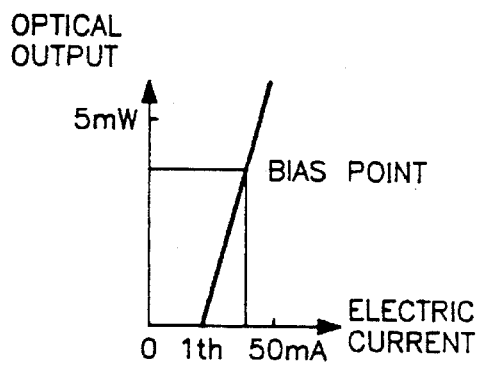
FIG. 3(d) is a graph illustrating the relationship between the bias current and the optical output at point D in FIG. 3(b).
Figure 3E:
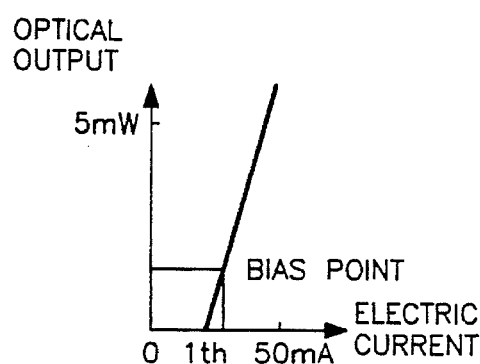
FIG. 3(e) is a graph illustrating the relationship between the bias current and the optical output at point N in FIG. 3(b).
Figure 3F:
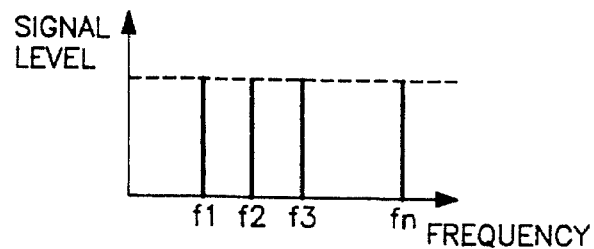
FIG. 3(f) is a graph schematically showing a multiplexed optical signal found at point F in FIG. 1(a).

The configuration of an optical signal transmission system with which a phototransmission method according to the invention is used is not limited to that of FIG. 1(a) and a ramified system configuration as shown in FIG. 2 is also feasible. The optical signal transmission system of FIG. 2 is similar to that of FIG. 1(a) in that a single receiving station 2 deals with two or more than two transmitting stations $1_1$, $1_2$, ..., $1_n$ but has a route for multiplexing optical signals up to the optical transmission path 15 that differs from the counterpart in FIG. 1(a). Regardless of configuration, a phototransmission system, if used with a signal transmission method according to the invention, can effectively reduce optical beat interference and control the levels of optical outputs, if the bias current of the semiconductor laser diode 3 of each transmitting station 1 is set to a value between one and a half times and five times, preferably between twice and four times, of the threshold current of the semiconductor laser and the output level of each semiconductor laser diode 3 is regulated at the output side of the semiconductor laser diode 3.

A phototransmission method according to the invention can be used with an optical signal transmission system comprising a number of transmitting stations, the equipment of which may be exchanged. For example, if the camera 11, the modulator 12 and the semiconductor laser diode 3 of the transmitting station $1_1$ are moved into the transmitting station $1_3$ and vice versa, the output levels of the transmitting stations $1_1$ and $1_3$ need not to be regulated for another time. This way equipment exchange can be carried out in a very short period of time so long as the semiconductor laser diode 3 of the transmitting stations 11 and 13 have been regulated to exhibit a substantially the same output level. Differently stated, so long as the optical attenuator 4 of each transmitting station is regulated to meet the requirements of the location, the camera, the modulator and the semiconductor laser diode of each transmitting station can be moved to any other station. Thus, an optical signal transmission method according to the invention can be used with an phototransmission system comprising cameras, modulators and semiconductor laser diodes that are portable or movable.

While DFB lasers are used for the semiconductor laser diodes in the above described modes of carrying out the invention, they may be replaced by less expensive lasers such as Fabry-Perot lasers if they meet the requirements of the optical signal transmission system.

Advantages of the Invention

According to the first aspect of the invention, a phototransmission system of the invention offers the following advantages if it is used with a compatible optical signal transmission system.

(1) Since the bias current of each semiconductor laser diode 3 of the system is found between one and a half times and five times the threshold current of the semiconductor laser diode 3, an excellent spectrum of light confined within a band width of 50 MHz is obtained.

(2) Since an excellent spectrum of light confined within a band width of 50 MHz is obtained, it is sufficient to separate any two close wavelengths of optical signals generated by semiconductor laser diodes 3 with a gap that is much narrower than the one separating two wavelengths in a conventional signal transmission system. More specifically, the gap may be as narrow as 0.2 nm.

(3) Since the gap separating any two close wavelengths can be reduced, the system can accommodate a large number of transmitting stations 1. More specifically, in a phototransmission system for FM video transmission using a method according to the invention and comprising 30 transmitting stations, a C/N ratio of greater than 15 dB has been proved with a gap of 0.2 nm separating two close wavelengths.

(4) Since the bias current is less than five times the threshold current, the linearity of the current-optical output relationship is maintained without increasing the distorted signal component and curtailing the service life of the semiconductor laser diode.

(5) Since the output optical signal level generated by each semiconductor laser diode 3 is regulated at the optical output terminal of the semiconductor laser diode 3, the bias currents of the semiconductor laser diodes 3 of the transmitting stations 1 of the system can be set to the same level and do not have to be differentiated. Thus, the spectra of light produced by two or more than two semiconductor laser diodes 3 are practically the same and therefore remain stable. This advantage also encourages the attempt to reduce the gap separating two close wavelengths of optical signals generated by semiconductor laser diodes while achieving an excellent C/N (carrier/noise) ratio to improve the optical signal quality of the system without producing optical beat interference noises.

(6) Since the bias currents of the semiconductor laser diodes of all the transmitting stations $1_1$, $1_2$, ..., $1_n$ can be set to the same level and optical signals from the semiconductor laser diodes 3 can be regulated by the respective optical attenuators 4, the equipment installed for regulating bias currents can be remarkably simplified.

According to the second aspect of the invention, since the bias current of each semiconductor laser diode 3 of an optical signal transmission system used with a signal transmission system of the invention is found between twice and four times the threshold current of the semiconductor laser diode 3, the spectrums of light produced by the semiconductor laser diodes of the system and the linearity of the current-optical output relationship can be further improved.

Since the levels of optical signals generated by the semiconductor lasers of a phototransmission system used with a signal transmission method of the invention are preferably regulated by respective optical attenuators, the operation of level regulation can be greatly simplified and the gap separating any two close wavelengths of optical signals generated by semiconductor laser diodes can be reduced even if the system comprises a large number of transmitting stations, which is a great advantage in designing the system configuration.

What is claimed is:

1. A phototransmission method of operating a phototransmission system having two or more semiconductor laser diodes and a single receiving station, said method comprising the steps of:

setting a difference between wavelengths of said two or more semiconductor laser diodes to less than one nanometer;

generating, at each of said two or more semiconductor laser diodes, a respective optical signal modulated by a signal to be transmitted;

collectively receiving the respective optical signal from each of the two or more semiconductor laser diodes;

demodulating each respective optical signal;

regulating a light intensity level of each respective optical signal produced at an optical output terminal of said two or more semiconductor laser diodes by setting a bias current of each semiconductor laser diode to a value between one and a half times and five times the threshold current of the semiconductor laser diode; and further regulating an output level at said optical output terminal.

2. The phototransmission method according to claim 1, wherein the light intensity levels of optical signals produced by different semiconductor lasers of the optical transmission system are regulated by respective optical attenuators operating to produce different degrees of attenuation.

3. A phototransmission method of operating a phototransmission system having two or more semiconductor laser diodes and a single receiving station, said method comprising the steps of:

setting a difference between wavelengths of said two or more semiconductor laser diodes to less than one nanometer;

generating, at each of said two or more semiconductor laser diodes, a respective optical signal modulated by signals to be transmitted;

collectively receiving the respective optical signal from each of the two or more semiconductor laser diodes;

demodulating each respective optical signal;

regulating a light intensity level of each respective optical signal produced at an optical output terminal of said two or more semiconductor laser diodes by setting a bias current of each semiconductor laser diode to a value between twice and four times the threshold current of the semiconductor laser diode; and further regulating an output level at said optical output terminal.

* * * * *